Figure 1:
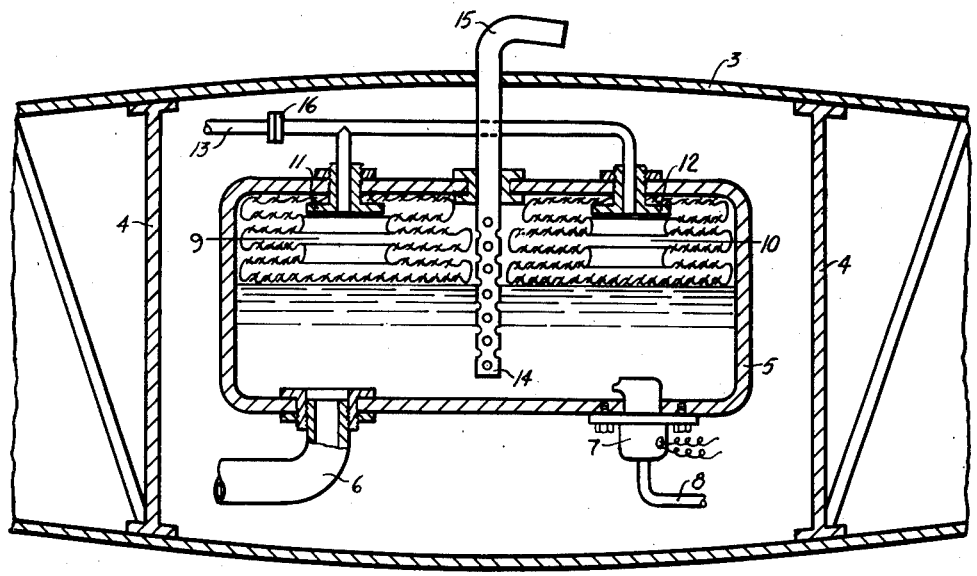

Sept. 2, 1952  A. G. CATTANEO  2,609,118

AIRCRAFT FUEL TANK

Filed Jan. 29, 1949

Inventor: Alfred G. Cattaneo
By: Oswald H. Milmore
His Attorney

Patented Sept. 2, 1952

2,609,118

UNITED STATES PATENT OFFICE 2,609,118

AIRCRAFT FUEL TANK

Alfred G. Cattaneo, Contra Costa County, Calif., assignor to Shell Development Company, San Francisco, Calif., a corporation of Delaware Application January 29, 1949, Serial No. 73,478

5 Claims. (Cl. 220—85)

This invention relates to aircraft fuel tanks provided with means for separating the air occupying the empty space within the tank from the liquid fuel in order to eliminate the fire and explosion hazards commonly associated with conventional tanks.

Various expedients have been considered by the aircraft industry to eliminate the fire and explosion hazards associated with the presence of an explosive fuel vapor-air mixture in the vapor space in fuel tanks above the fuel level under certain conditions of temperature and altitude in which modern aircraft are operated. These expedients include blanketing by an inert gas, sweeping the space free of fuel vapor, and others. All of these methods have considerable disadvantages of weight, complication, etc.

Explosive fuel vapor-air mixtures do not very often occur when highly volatile fuels, such as gasoline, are used because under all except extremely low temperature conditions these fuels have a vapor pressure so high that the space in the tanks above the liquid is filled with a fuel vapor-air mixture too rich in fuel vapor to be explosive. When less volatile fuels, such as those used for jet propulsion devices, are used less vaporization occurs, and the space in the tanks above the liquid is filled with a much leaner fuel vapor-air mixture. If the density of the air is low, either because of high atmospheric temperature or because of the altitude of flight of the aircraft, the mixture is frequently explosive.

The instant invention has as an object the provision of an improved fuel tank, suitable for use in aircraft, for storing fuels, such as gasoline, kerosene, jet propulsion fuel, etc., without likelihood of forming combustible fuel vapor-air mixtures.

A further object is to provide a fuel storage system for aircraft for eliminating the fire and explosion hazard associated with earlier fuel tanks which is light in weight and simple in operation.

Briefly, according to the invention, the fuel tank, having substantially rigid walls, has one or more flexible walls to divide the tank into a fuel compartment and an air compartment. While a diaphragm may in certain cases be used, it is preferred to employ one or more bags tailored to such shape that in their extended or dilated position they fill the tank space entirely; such bag or bags may be made of very thin collapsible material, such as thin sheets of synthetic rubber, e. g., a chloroprene like neoprene, or fabric made thereof or of silk or nylon filaments, impregnated, if necessary, to be impervious to gases and to hydrocarbon liquids. The space within the fuel tank and on one side of the flexible wall—either inside or outside of the bag or bags, when bags are used—serves as the fuel compartment, and the space on the other side of the wall forms an air compartment and contains air under slight pressure sufficient to press the bag wall against the liquid fuel and avoid the occurrence of any substantial vapor space in the fuel compartment. The fuel compartment is, further, provided with a vent to the outside atmosphere, disposed to permit the free escape of air or vapor from the fuel compartment but having a height sufficient to prevent the efflux of liquid. When the tank is full of fuel the bag or bags lie collapsed against one of the sides of the tank—usually the top—in the case where the fuel compartment is outside of the bag; in the case where the fuel compartment is the inside of the bag the bags are dilated when the tank is full of fuel. The air compartment is fitted with an air duct for admitting air under a slight pressure, e. g., from 10 to 100 mm. of water gauge; such air is conveniently pressurized by an air scoop on the aircraft or by a blower or fan on the engine or driven by a separate electric motor. As the fuel is withdrawn from the fuel compartment in flight the air expands the air compartment, maintaining the flexible wall thereof in contact with the liquid fuel, thereby preventing the formation of a vapor space.

Figure 2:
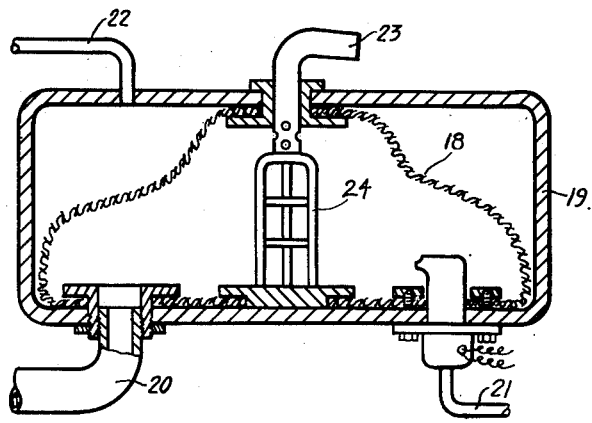

The invention will be described further by reference to the accompanying drawing forming a part of this specification and showing two preferred embodiments by way of illustration, wherein:

Fig. 1 is a vertical sectional view of a wing fuel tank constructed according to the invention, certain parts being shown in elevation; and Fig. 2 is a cross-sectional view of a modified construction wherein the inside of the bag is the fuel compartment.

In Fig. 1, numeral 3 indicates the wing of an aircraft having struts 4 extending within the wing. Such a wing may contain one or several fuel tanks of various shapes and sizes to conform to the wing structure and in some cases the metal skin of the wing may serve as one or more walls of such tanks. One of such tanks is indicated at 5, and is provided with a fuel inlet line 6, an electrically operated fuel pump 7 and a fuel discharge line 8. The invention may, as is evident, be applied also to tanks which do not employ fuel pumps.

Two collapsible bags 9 and 10, made of suitable thin sheet material, are fitted within the fuel tank, being tailored to fit the tank wall and to fill the tank completely when dilated. It is preferred to employ flexible sheet material, such as fabric, which may be folded to form corrugations as shown. These bags are fastened to the fuel tank at the top at 11 and 12, at which points an air duct 13 is brought into communication with the interior of the bags, this interior forming the air compartment. The air duct is connected to a source of air pressure (not shown) at any convenient point or points on the aircraft, such as an air scoop or an auxiliary fan or air compressor driven by an engine or motor. It being desired that the air pressure be maintained relatively constant, some form of engine-driven air compressor is usually preferred. The pressure in duct 13, may, for example, be about 50 mm. of water gauge.

The tank is provided with a vent comprising a perforated tube 14 extending throughout a substantial part of the height of the tank in the space outside of the bag wall, i. e., in the fuel compartment. The vent may be open at the bottom and sealed to the top wall of the tank and extends upwardly through the upper wing surface forming a vapor pipe; above the wing it is turned astern at 15 to prevent rain water from entering the tank. The height of the vent tube above the wing varies with different designs, being usually kept as low as possible to avoid drag, but high enough to avoid spillage of fuel. The air pressure in duct 13 must necessarily be low enough to avoid forcing fuel up the vent. The bags are arranged on opposite sides of the vent tube 14, which extends downwardly far enough to be always in communication with the fuel compartment, even though some portions thereof may be shrouded by the bags; conversely, the perforations extend to or near to the top of the fuel compartment to draw off vapors even when the fuel compartment is almost full. In this manner isolation of the vent from the fuel surface is prevented.

From the foregoing description it is evident that when the fuel tank is filled through the line 6 the fuel will collapse the bags 9 and 10 against the top of the fuel tank. The air previously within the bags will be forced out through the duct 13, creating a back pressure and preventing the occurrence of any vapor space above the liquid fuel even if the tank is filled without applying a positive air pressure to the duct 13. An orifice 16 may optionally be fitted in duct 13 to retard the escape of air and maintain a slight pressure within the bags as the tank is being filled; it is also possible to fill the tanks while maintaining a positive air pressure on duct 13, e. g., from a compressor or air reservoir (not shown). The pressure must, of course, not be high enough to prevent inflow of fuel through pipe 6, and the orifice 16, if used, must permit the escape of air at the rate of fuel inflow to avoid spillage through the vent. As fuel is withdrawn in flight the bags expand under the air pressure applied, moving downwardly as the fuel level falls. Any air or vapor which may be present within the fuel compartment at any time, as before filling or during use, is forced to escape through the vent 14; this at all times insures the absence of a combustible fuel vapor-air mixture within the fuel tank.

In the modified embodiment according to Fig. 2 the space inside of the bag forms the fuel compartment and the outer space is the air compartment. In this case the bag 18 is preferably fastened to the top and bottom of the fuel tank 19, the inlet and discharge pipes 20 and 21 being connected to the bottom. The pressure air duct 22 is connected to upper part of the fuel tank and the vent comprises a vapor pipe 23 connected to the top, extending into the fuel compartment. When the vent pipe is not brought down to the bottom of the fuel compartment a frame 24 is preferably mounted beneath the vent pipe to prevent the sides of the bag 18 from collapsing laterally and isolating the vapor pipe 23 from the surface of the fuel, thereby closing off communication between the fuel and the vent. The device according to Fig. 2 operates on the same principle as that of Fig. 1, and the bag prevents the formation of a combustible fuel vapor-air mixture above the fuel.

It is evident that numerous changes may be made in the constructional details without departing from the spirit of the invention, as defined in the appended claims, and without losing the advantages thereof. Thus, the long vent tube 14 and the cage frame 24 may be used interchangeably, and are not limited to the specific tank arrangements associated therewith in the drawing.

I claim as my invention:

1. A tank for storing a variable quantity of liquid fuel vented to the atmosphere substantially without the presence of a vapor space above the liquid fuel comprising, in combination: a substantially rigid tank; partition means within said tank having at least one wall of flexible material dividing said rigid tank into a fuel compartment and a gas compartment sealed from the fuel compartment and closed to retain gas at a slight superatmospheric pressure, the said flexible material being mounted with slack so as to be movable to enlarge the volume of either of said compartments to occupy the major part of the space within said rigid tank while correspondingly decreasing the volume of the other of said compartments; liquid fuel supply and discharge means having communication with said fuel compartment at the bottom thereof; an open vapor vent in communication with said fuel compartment and with the ambient atmosphere for discharging vapors therefrom to a point outside of the tank; and gas supply means in communication with the gas compartment for admitting gas from a source outside of the tank under a superatmospheric pressure insufficient to force liquid fuel through said open vent, whereby gas admitted into the gas compartment will move said wall to reduce the volume of the fuel compartment to correspond substantially to the volume of liquid stored therein.

2. A tank according to claim 1 wherein the partition means comprises one or more bags of flexible material within the tank.

3. A tank according to claim 1 wherein the vapor vent comprises a structure within the fuel compartment extending throughout the major portion of the height thereof and having vapor openings along the length thereof for receiving vapor from various heights of the fuel compartment.

4. A tank according to claim 1 wherein the partition means comprises a plurality of bags of flexible material within the tank, the insides of the said bags constituting the said gas compartment and the space outside of the bags constituting the said fuel compartment, and the said vapor vent comprises a vertically elongate tube situated between a pair of said bags having perforations throughout different heights distributed over a major part of the height of said tank for receiving vapors from various heights of the fuel compartment.

5. A fuel tank according to claim 1 wherein the vent means comprises a cage-like structure situated within the fuel compartment and enclosing a small, vertically elongated space in free communication with the fuel compartment at a plurality of levels, said space being in communication with the ambient atmosphere through a vapor inlet through the tank wall, whereby the said flexible wall is prevented from isolating said vapor inlet from the surface of liquid in said fuel compartment.

ALFRED G. CATTANEO.

REFERENCES CITED

The following references are of record in the file of this patent:

UNITED STATES PATENTS

| Number | Name | Date |
|---|---|---|
| 1,533,309 | Durborow | Apr. 14, 1925 |
| 1,652,793 | Perry | Dec. 13, 1927 |
| 1,695,076 | Zohe | Dec. 11, 1928 |
| 1,879,628 | Mendenhall et al. | Sept. 27, 1932 |
| 2,063,430 | Graser | Dec. 8, 1936 |
| 2,179,682 | Booth | Nov. 14, 1939 |
| 2,283,100 | Shores | May 12, 1942 |
| 2,289,139 | Marner | July 7, 1942 |
| 2,404,418 | Walker | July 23, 1946 |

FOREIGN PATENTS

| Number | Country | Date |
|---|---|---|
| 47,829 | France | Apr. 20, 1937 |
| 120,237 | Great Britain | Oct. 21, 1918 |